US011193012B2

(12) United States Patent
Lopez et al.

(10) Patent No.: US 11,193,012 B2
(45) Date of Patent: Dec. 7, 2021

(54) CLARIFIER BLENDS FOR OPTIMUM PERFORMANCE

(71) Applicant: FINA TECHNOLOGY, INC., Houston, TX (US)

(72) Inventors: Margarito Lopez, Pasadena, TX (US); Michael Allen McLeod, Houston, TX (US); Jon Tippet, League City, TX (US); Douglas Burmaster, Houston, TX (US); John Ashbaugh, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 138 days.

(21) Appl. No.: 16/568,049

(22) Filed: Sep. 11, 2019

(65) Prior Publication Data

US 2020/0079943 A1  Mar. 12, 2020

Related U.S. Application Data

(60) Provisional application No. 62/730,205, filed on Sep. 12, 2018.

(51) Int. Cl.
*C08K 5/053* (2006.01)
*C08L 23/12* (2006.01)
*C08K 5/18* (2006.01)

(52) U.S. Cl.
CPC .............. *C08L 23/12* (2013.01); *C08K 5/053* (2013.01); *C08K 5/18* (2013.01); *C08L 2201/10* (2013.01); *C08L 2207/04* (2013.01)

(58) Field of Classification Search
CPC .. C08L 23/12; C08L 2201/10; C08L 2207/04; C08K 5/053; C08K 5/18; C08K 5/0083; C08K 5/20; C08K 5/1565; C08K 5/1575
See application file for complete search history.

(56) References Cited

U.S. PATENT DOCUMENTS 5,998,039 A * 12/1999 Tanizaki ................. C08L 23/12
428/516
2012/0190797 A1* 7/2012 Kristiansen .............. C08K 5/20
525/340

FOREIGN PATENT DOCUMENTS

| CN | 106750909 A | 5/2017 |
| WO | 2011032861 A1 | 3/2011 |
| WO | 2016025326 A1 | 2/2016 |

OTHER PUBLICATIONS

International Search Report and Written Opinion issued in Application No. PCT/US2019/050668, dated Nov. 25, 2019, 13 pages.

* cited by examiner

*Primary Examiner* — Robert S Jones, Jr.
(74) *Attorney, Agent, or Firm* — Albert Shung

(57) ABSTRACT

A thermoplastic polyolefin composition and methods for its use is disclosed. The composition can include a thermoplastic polyolefin and a clarifying agent blend comprising a trisamide clarifier and sorbitol clarifier at a ratio of trisamide clarifier to sorbitol clarifier of 1:2 to 1:40 w/w.

19 Claims, 4 Drawing Sheets

CLARIFIER BLENDS FOR OPTIMUM PERFORMANCE

CROSS REFERENCE TO RELATED APPLICATIONS

This application claims the benefit of U.S. Provisional Patent Application No. 62/730,205 filed Sep. 12, 2018. The contents of the referenced application are incorporated into the present application by reference.

BACKGROUND OF THE INVENTION

A. Field of the Invention

The invention generally concerns clarifying blends that can be used as additives for thermoplastic polyolefin compositions. Such blends can help increase the clarity of these polymeric compositions. In particular, blends of a trisamide-based clarifier and a sorbitol-based clarifier can be used with the compositions of the present invention.

B. Description of Related Art

Clarifiers are a subclass of thermoplastic polymer (e.g., polypropylene) nucleators, which provide both nucleation and improved clarity to polymeric compositions. The improved clarity is attributed to the very fine crystal size formed with using clarifiers. The size of the polymer crystals is small enough to permit improved light transmission through the polymeric composition. Two classes of clarifiers, which have generally been thought to be incompatible with one another, are commonly used in industry, sorbitol derivatives and trisamides.

Sorbitol derivatives include Millad 3905 (1,2,3,4-dibenzylidene sorbitol, CAS #: 32647-67-9), Millad 3940 (1,2,3,4-di-para-methylbenzylidene sorbitol. CAS #: 54686-97-4), Millad 3988 (1,2,3,4-di-meta, para-methylbenzylidene sorbitol. CAS #: 135861-56-2), and Millad NX8000 (propylphenyl)methylene]-Nonitol" with the term 1,2,3-trideoxy-4,6:5,7-bis-O-[(4-propylphenyl)methylene]-Nonitol. CAS Reg. No. 882073-43-0). These derivatives are effective but have significant limitations. In particular, all sorbitol derivatives are sensitive to thermal degradation when taken to high processing temperatures. High temperatures cause the clarifiers to degrade, making them ineffective and causing odor and plateout problems. Millad 3905 is known to have an almond-like odor that is offensive in some applications. Millad 3940 is also prone to offensive odors due to residual aldehydes. In addition, dispersion is a problem with some of these clarifiers, causing visible imperfections seen as white specks.

Trisamide clarifiers possess some advantages over the sorbitol derivatives, but have their own shortcomings. A critical shortcoming is that they tend to be significantly less effective in thicker polymeric compositions. Many molding processes produce parts with a variety of thicknesses. Having a product that only functions in a fraction of a total product line is inefficient and often an insurmountable barrier for commercialization of such a product.

One attempt at solving the problems associated with clarifiers has been to create blends. However, it is known that additive blend approaches often do not succeed due to antagonistic interactions. By way of example, blends of various sorbitol derivatives (e.g., blend of Millad 3988 and NX8000) can oftentimes have a strong antagonistic interaction that significantly increases haze and decreases gloss of the resulting polymeric composition. Such interactions are problematic for molders as they compromise product quality and create more offgrade purge if changing between products with different clarifiers.

SUMMARY OF THE INVENTION

A discovery has been made that provides a solution to at least some of the aforementioned problems encountered with the use of clarifiers for thermoplastic polyolefin compositions. In particular, the solution is premised on the use of a clarifying agent blend of a trisamide-based clarifier and a sorbitol-based clarifier. The weight ratio of the trisamide clarifier to the sorbitol clarifier, based on the total weight of the combination of the two (i.e., the clarifying agent blend), can be 1:2 to 1:40 w/w, alternatively 1:5 to 1:20 w/w, or alternatively about 1:10 w/w. Without wishing to be bound by theory, it is believed that blends of these compounds in the aforementioned weight ratios results in a stable blend that does not have the expected antagonistic interactions. Notably, the use of these blends in thermoplastic polyolefin compositions provides for improved clarity by a reduction in haze in the resulting polymeric composition. Further, the improved clarity can be realized through varying thicknesses of the composition, thereby providing a technical achievement over the currently available clarifiers and clarifier blends such as those discussed above.

In one aspect of the present invention, a thermoplastic polyolefin composition is disclosed. The composition can include: (a) a thermoplastic polyolefin; and (b) a clarifying agent blend comprising a trisamide clarifier and sorbitol clarifier. In certain aspects clarifying agent blend can comprise a ratio of trisamide clarifier to sorbitol clarifier of between 1:2, 1:5, 1:10, 1:15, 1:20 to 1:25, 1:30, 1:35, 1:40 w/w, including all ratios and ranges of ratios there between. In particular aspects, the clarifying agent blend can have a trisamide clarifier to sorbitol clarifier ratio of between 1:5 to 1:20, alternatively about 1:10. In certain aspects the clarifying agent blend (trisamide clarifier and sorbitol clarifier) is about 0.1 to 0.5 wt. % of the thermoplastic polyolefin composition, alternatively 0.2 wt. % to 0.25 wt. %. The trisamide clarifier can be a trisamide benzene compound. In certain aspects the trisamide benzene compound is N,N',N''-benzene-1,3,5-triyltris(2,2-dimethylpropanamide) or RlKa-clear® PC1 (N,N',N''-Tris (2-methylcyclohexyl)-1,2,3-propanetricarboxamide, CAS Number: 160535-46-6). In some instances, the sorbitol clarifier can be Millad 3905 (1,2,3,4-dibenzylidene sorbitol, CAS #32647-67-9), Millad 3940 (1,2,3,4-di-para-methylbenzylidene sorbitol, CAS #54686-97-4), Millad 3998 (1,2,3,4-di-meta, para-methylbenzylidene sorbitol, CAS #135861-56-2), or NX8000 (1,2,3-trideoxy-4,5:5,7-bis-O-[(4-propylphenyl)methylene]-Nonitol, CAS #882073-43-0). In particular aspects, the sorbitol clarifier is NX8000.

In certain aspects the thermoplastic polyolefin composition is in the form of a pellet. In a further aspect the composition is in the form of a molded or extruded article. The thermoplastic polyolefin composition can have a haze % between 2, 5, 10, 15 to 20, 25, 30, 35, 40% at a thickness of 5, 10, 15, 20, 25, 30, 35, 40, 45, 50, 55, 60, 65, 70, 75, 80, 85, 90, 95, 100 or more. In particular aspect the thickness is of 20 to 80 mils.

The thermoplastic polyolefin composition can further comprise at least one additive. The additive can be selected from a light stabilizer, an anti-static agent, a rheological modifier, a lubricant, or an antioxidant, or any combination thereof. The thermoplastic polyolefin composition can comprise a light stabilizer at 0.01 wt. % to 1 wt. %, alternatively 0.01 wt. % to 0.1 wt. % of the composition. In certain aspects the light stabilizer is a hindered amine light stabilizer. The thermoplastic polyolefin composition can comprise an anti-static agent at 0.01 wt. % to 1 wt. %, alternatively 0.01 wt. % to 0.1 wt. % of the composition. In certain aspects the anti-static agent is glycerol monostearate. The thermoplastic polyolefin composition can comprise a rheological modifier at 0.01 wt. % to 1 wt. %, alternatively 0.01 wt. % to 0.1 wt. % of the composition. In certain aspects the rheological modifier is an organic peroxide. The thermoplastic polyolefin composition can comprise a lubricant at 0.01 wt. % to 1 wt. %, alternatively 0.01 wt. % to 0.1 wt. % of the composition. In certain aspects the lubricant is a metal stearate. The thermoplastic polyolefin composition can comprise an antioxidant at 0.01 wt. % to 1 wt. %, alternatively 0.01 wt. % to 0.1 wt. %, of the composition. In certain aspects the antioxidant is a phosphite-based antioxidant. The thermoplastic polyolefin composition can comprise at least 90 wt. %, alternatively at least 95 wt. %, or alternatively, at least 99 wt. % of a thermoplastic polyolefin or a blend of thermoplastic polyolefins. In certain aspects the thermoplastic polyolefin or thermoplastic polyolefin blend can be polypropylene or a polypropylene blend.

Other embodiments of the invention are directed to methods for clarifying a thermoplastic polyolefin composition. The method can include combining an effective amount of a clarifying agent blend with a thermoplastic polyolefin composition. In certain aspects, the clarifying agent blend includes a trisamide clarifier and a sorbitol clarifier. The trisamide clarifier and the sorbitol clarifier can be present at a weight ratio of between 1:2 to 1:40. The clarifying agent blend can be about 0.1 to 0.5 wt. % of the thermoplastic polyolefin composition, alternatively 0.2 wt. % to 0.25 wt. %. The thermoplastic polyolefin composition can comprise at least 90 wt. %, alternatively at least 95 wt. %, or alternatively, at least 99 wt. % of a thermoplastic polyolefin or a blend of thermoplastic polyolefins. In certain aspects the thermoplastic polyolefin or thermoplastic polyolefin blend can be polypropylene or a polypropylene blend. In certain aspects the thermoplastic polyolefin composition is a thermoplastic polypropylene composition, the trisamide clarifier is a trisamide benzene compound, alternatively N,N',N"-benzene-1,3,5-triyltris(2,2-dimethylpropanamide), and the sorbitol clarifier can be or is Millad 3905 (1,2,3,4-dibenzylidene sorbitol, CAS #32647-67-9), Millad 3940 (1,2,3,4-di-para-methylbenzylidene sorbitol, CAS #54686-97-4), Millad 3998 (1,2,3,4-di-meta, para-methylbenzylidene sorbitol, CAS #135861-56-2), or NX8000 (1,2,3-trideoxy-4,5:5,7-bis-O-[(4-propylphenyl)methylene]-Nonitol, CAS #882073-43-0). In particular aspects the sorbitol clarifier is NX8000. The thermoplastic polyolefin composition can be any of the composition described herein.

A further embodiment of the present invention is directed to methods for reducing haze in a thermoplastic polyolefin composition. The method can include: (a) obtaining a clarifying agent blend comprising a trisamide clarifier and a sorbitol clarifier at a weight ratio of 1:2 to 1:40; (b) combining an effective amount of the clarifying agent blend to a thermoplastic polyolefin composition; and (c) extruding or molding the thermoplastic polyolefin composition, wherein the thermoplastic polyolefin composition has a haze % of less than 40%, less than 30%, less than 20%, less than 10%, less than 5%, or 40% to 2%, at a thickness or 20 to 80 mils. The clarifying agent blend can be about 0.1 to 0.5 wt. % of the thermoplastic polyolefin composition, alternatively 0.2 wt. % to 0.25 wt. %. The thermoplastic polyolefin composition can include a thermoplastic polypropylene composition, a trisamide clarifier, which can be a trisamide benzene compound, alternatively N,N',N"-benzene-1,3,5-triyltris(2,2-dimethylpropanamide), and a sorbitol clarifier, which can be Millad 3905 (1,2,3,4-dibenzylidene sorbitol, CAS #32647-67-9), Millad 3940 (1,2,3,4-di-para-methylbenzylidene sorbitol, CAS #54686-97-4), Millad 3998 (1,2,3,4-di-meta, para-methylbenzylidene sorbitol, CAS #135861-56-2), or NX8000 (1,2,3-trideoxy-4,5:5,7-bis-O-[(4-propylphenyl)methylene]-Nonitol, CAS #882073-43-0). In particular aspects the sorbitol clarifier is NX8000.

Also disclosed in the context of the present invention are aspects 1-24. Aspect 1 is a thermoplastic polyolefin composition comprising: (a) a thermoplastic polyolefin; and (b) a clarifying agent blend comprising a trisamide clarifier and a sorbitol clarifier at a ratio of trisamide clarifier to sorbitol clarifier of 1:2 to 1:40 w/w. Aspect to is the composition of aspect 1, wherein the clarifying agent blend has a trisamide clarifier to sorbitol clarifier ratio of 1:5 to 1:20, alternatively about 1:10. Aspect 3 is the composition of any one of aspects 1 to 2, wherein the clarifying agent blend is about 0.1 to 0.5 wt. % of the thermoplastic polyolefin composition, alternatively 0.2 wt. % to 0.25 wt. %. Aspect 4 is the composition of any one of aspects 1 to 3, wherein the trisamide clarifier is a trisamide benzene compound. Aspect 5 is the composition of aspect 4, wherein the trisamide benzene compound is N,N',N"-benzene-1,3,5-triyltris(2,2-dimethylpropanamide). Aspect 6 is the composition of any one of aspects 1 to 5, wherein the sorbitol clarifier is 1,2,3,4-dibenzylidene sorbitol, 1,2,3,4-di-para-methylbenzylidene sorbitol, 1,2,3,4-di-meta, para-methylbenzylidene sorbitol, or 1,2,3-trideoxy-4,5:5,7-bis-O-[(4-propylphenyl)methylene]-Nonitol, alternatively 1,2,3-trideoxy-4,5:5,7-bis-O-[(4-propylphenyl)methylene]-Nonitol. Aspect 7 is the composition of any one of aspects 1 to 6, wherein the thermoplastic polyolefin is polypropylene. Aspect 8 is the composition of any one of aspects 1 to 7, wherein the composition is in the form of a pellet. Aspect 9 is the composition of any one of aspects 1 to 8, wherein the composition is in the form of a molded or extruded article. Aspect 10 is the composition of any one of aspects 1 to 9, wherein the composition has a haze % of 2 to 40% at a thickness of 20 to 80 mils. Aspect 11 is the composition of any one of aspects 1 to 10, further comprising at least one additive selected from a light stabilizer, an anti-static agent, a rheological modifier, a lubricant, an antioxidant, or any combination thereof. Aspect 12 is the composition of aspect 11, comprising: 0.01 wt. % to 1 wt. %, alternatively 0.01 wt. % to 0.1 wt., of the light stabilizer; 0.01 wt. % to 1 wt. %, alternatively 0.01 wt. % to 0.1 wt. %, of the anti-static agent; 0.01 wt. % to 1 wt. %, alternatively 0.01 wt. % to 0.1 wt. %, of the rheological modifier; 0.01 wt. % to 1 wt. %, alternatively 0.01 wt. % to 0.1 wt. %, of the lubricant; and/or 0.01 wt. % to 1 wt. %, alternatively 0.01 wt. % to 0.1 wt. %, of the antioxidant. Aspect 13 is the composition of any one of aspects 11 to 12, wherein: the light stabilizer is a hindered amine light stabilizer; the anti-static agent is a glycerol monostearate; the rheological modifier is an organic peroxide; the lubricant is a metal stearate; and/or the antioxidant is a phosphite-based antioxidant. Aspect 14 is the composition of any one of aspects 1 to 13, comprising at least 90 wt. %, alternatively at least 95 wt. %, or alternatively, at least 99 wt. % of the thermoplastic polyolefin or a blend of thermoplastic polyolefins.

Aspect 15 is an article of manufacture comprising a thermoplastic polyolefin composition of any of aspects 1 to 14. Aspect 16 is the article of aspect 15, wherein the thermoplastic polyolefin composition has a haze % of 2 to 40% at a thickness of 20 to 80 mils.

Aspect 17 is a method for clarifying a thermoplastic polyolefin composition, the method comprising combining an effective amount of a clarifying agent blend to a thermoplastic polyolefin composition, the clarifying agent blend comprising a trisamide clarifier and sorbitol clarifier at a ratio of between 1:2 to 1:40. Aspect 18 is the method of aspect 17, wherein the clarifying agent blend is about 0.1 to 0.5 wt. % of the thermoplastic polyolefin composition, alternatively 0.2 wt. % to 0.25 wt. %. Aspect 19 is the method of any one of aspects 17 to 18, wherein the thermoplastic polyolefin composition is a thermoplastic polypropylene composition, the trisamide clarifier is a trisamide benzene compound, alternatively N,N',N''-benzene-1,3,5-triyltris(2,2-dimethylpropanamide), and the sorbitol clarifier is 1,2,3,4-dibenzylidene sorbitol, 1,2,3,4-di-para-methylbenzylidene sorbitol, 1,2,3,4-di-meta, para-methylbenzylidene sorbitol, or 1,2,3-trideoxy-4,5:5,7-bis-O-[(4-propylphenyl)methylene]-Nonitol, alternatively 1,2,3-trideoxy-4,5:5,7-bis-O-[(4-propylphenyl)methylene]-Nonitol. Aspect 20 is the method of any one of aspects 17 to 19, wherein the thermoplastic polyolefin composition is the composition of any one of aspects 1 to 14. Aspect 21 is a method for reducing haze in a thermoplastic polyolefin composition, the method comprising: (a) combining an effective amount of a clarifying agent blend comprising a trisamide clarifier and sorbitol clarifier at a ratio of between 1:2 to 1:40 to a thermoplastic polyolefin composition; and (b) extruding or molding the thermoplastic polyolefin composition, wherein the thermoplastic polyolefin composition has a haze % of 2 to 40% at a thickness of 20 to 80 mils. Aspect 22 is the method of aspect 21, wherein the clarifying agent blend is about 0.1 to 0.5 wt. % of the thermoplastic polyolefin composition, alternatively 0.2 wt. % to 0.25 wt. %. Aspect 23 is the method of any one of aspects 20 to 22, wherein the thermoplastic polyolefin composition is a thermoplastic polypropylene composition, the trisamide clarifier is a trisamide benzene compound, alternatively N,N',N''-benzene-1,3,5-triyltris(2,2-dimethylpropanamide), and the sorbitol clarifier is 1,2,3,4-dibenzylidene sorbitol, 1,2,3,4-di-para-methylbenzylidene sorbitol, 1,2,3,4-di-meta, para-methylbenzylidene sorbitol, or 1,2,3-trideoxy-4,5:5,7-bis-O-[(4-propylphenyl)methylene]-Nonitol, alternatively 1,2,3-trideoxy-4,5:5,7-bis-O-[(4-propylphenyl)methylene]-Nonitol. Aspect 24 is the method of any one of aspects 21 to 23, wherein the thermoplastic polyolefin composition is the composition of any one of aspects 1 to 14.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

The use of the word "a" or "an" when used in conjunction with the term "comprising" in the claims and/or the specification may mean "one," but it is also consistent with the meaning of "one or more," "at least one," and "one or more than one."

The term "about" or "approximately" are defined as being close to as understood by one of ordinary skill in the art. In one non-limiting embodiment the terms are defined to be within 10%, alternatively within 5%, alternatively within 1%, and most alternatively within 0.5%.

The term "substantially" and its variations are defined to include ranges within 10%, within 5%, within 1%, or within 0.5%.

The terms "inhibiting" or "reducing" or "preventing" or any variation of these terms includes any measurable decrease or complete inhibition to achieve a desired result (e.g., reduction in haze %).

The term "effective," as that term is used in the specification and/or claims, means adequate to accomplish a desired, expected, or intended result.

The terms "wt. %," "vol. %," or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods of making and using the same of the present invention can "comprise," "consist essentially of," or "consist of" particular ingredients, components, blends, method steps, etc., disclosed throughout the specification. With respect to the transitional phase "consisting essentially of," in one non-limiting aspect, a basic and novel characteristic of the clarifying agent blends of the present invention are their ability to impart improved optical properties (e.g., improved clarity) to thermoplastic polyolefin compositions.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DETAILED DESCRIPTION OF THE INVENTION

Figure 1:
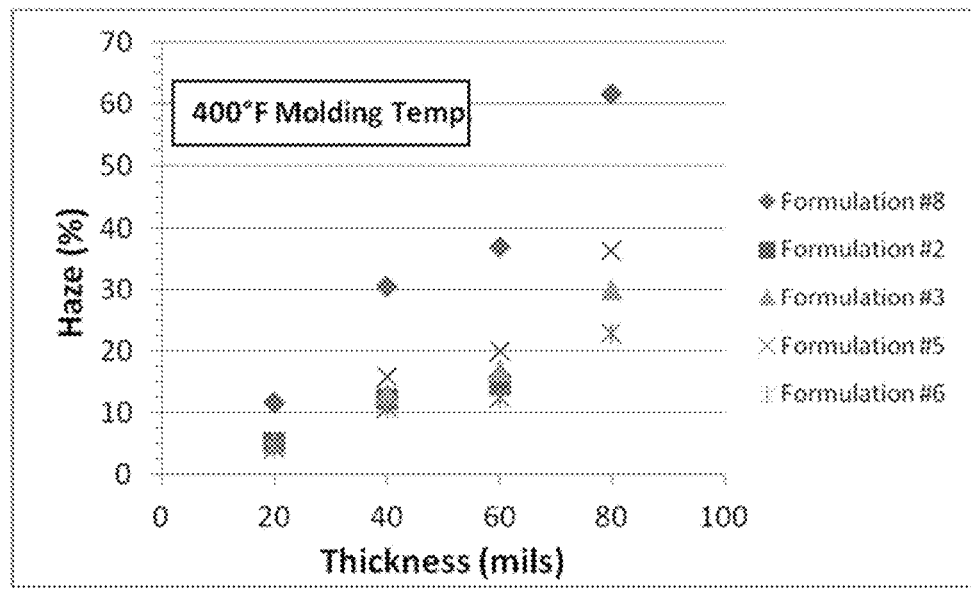
FIG. 1 illustrates the resulting haze percent as determined for formulations 2, 3, 5, 6, and 8 as a function of thickness at molding temperature of 400° F.

The improved optical properties of the thermoplastic polyolefin compositions of the present invention can be attributed to the inclusion of a clarifying agent blend of a trisamide-based clarifier and a sorbitol-based clarifier. As illustrated in a non-limiting manner in the Examples section, this combination of a trisamide-based clarifier and a sorbitol-based clarifier can unexpectedly co-exist together without experiencing any degradation of the compounds or other antagonistic interactions. Without wishing to be bound by theory, the stability of this blend can exist throughout the composition and throughout varying levels of thickness. This can result in articles of manufacture that have the ability to maintain a consistent optical quality irrespective of their sizes and shapes and irrespective of whether the articles of manufacture have varying degrees of thickness.

These and other non-limiting aspects of the present invention are discussed in further detail in the following sections with reference to the Figures.

A. Thermoplastic Polyolefin

The term "thermoplastic polyolefin" refers to a plastic that is prepared from at least one olefinic monomer (such as ethylene, propylene, butene, hexene or octene) that may be extruded or molded after being melted. Exemplary thermoplastic polyolefins may include polyethylene and polypropylene and blends thereof. Polypropylenes include homopolymers of propylene, copolymers of propylene and other olefins, and terpolymers of propylene, ethylene, and dienes. Polyethylenes include homopolymers of ethylene or copolymers of ethylene with at least one alpha olefin selected from the group consisting of butene, hexene and octene. Polyolefins may be prepared by any of the polymerization processes which are in commercial use (such as the so-called "high pressure" process; slurry process; solution process and/or gas phase process) and with the use of any of the known catalysts (including the so-called Ziegler Natta catalysts; chromium or Phillips catalysts; single site catalysts; and metallocene catalysts). The compositions of the present invention can include at least 90, 92, 94, 96, 98, to 99 wt. % of a thermoplastic polyolefin or a blend of thermoplastic polyolefins with respect to the total weight of the composition.

B. Clarifying Agent Blends

Polyolefin compositions of the invention can comprise a thermoplastic polyolefin and a clarifying agent blend. The clarifying agent blend can include a trisamide-based clarifier and sorbitol-based clarifier. Trisamide clarifiers include, but are not limited to, amide derivatives of benzene-1,3,5-tricarboxylic acid, amide derivatives of 1,3,5-benzenetriamine, derivatives of N-(3,5-bis-formylamino-phenyl)-formamide, derivatives of 2-carbamoyl-malonamide, and combinations thereof. In certain aspects the trisamide clarifier is N,N',N"-benzene-1,3,5-triyltris(2,2-dimethylpropanamide). Sorbitol clarifiers include, but are not limited to Millad 3905 (1,2,3,4-dibenzylidene sorbitol, CAS #: 32647-67-9, Milliken Chemical, Spartanburg, S. C.), Millad 3940 (1,2,3,4-di-para-methylbenzylidene sorbitol, CAS #: 54686-97-4, Milliken Chemical, Spartanburg, S.C.), Millad 3998 (1,2,3,4-di-meta, para-methylbenzylidene sorbitol, CAS #: 135861-56-2, Milliken Chemical, Spartanburg, S.C.) or NX8000 (1,2,3-trideoxy-4,5:5,7-bis-O-[(4-propylphenyl)methylene]-Nonitol, CAS Reg. No. 882073-43-0, Milliken Chemical, Spartanburg, S.C.).

In a certain aspect, the trisamide clarifier and sorbitol clarifier are present in a ratio of trisamide clarifier to sorbitol clarifier of between 1:2 to 1:40 w/w. This weight ratio is based on the total weight of the blend vis-à-vis the amount of each clarifier in the blend. For example, a ratio of 1:2 includes 33.33 parts trisamide clarifier and 66.66 parts sorbitol clarifier based on the total weight of the clarifying agent blend. Thus, a clarifying agent blend having a total weight of 10 grams would have 3.33 grams trisamide clarifier and 6.66 grams sorbitol clarifier. In certain aspects the clarifying agent blend has a trisamide clarifier to sorbitol clarifier ratio of 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:21, 1:22, 1:23, 1:24, 1:25, 1:26, 1:27, 1:28, 1:29, 1:30, 1:31, 1:32, 1:33, 1:34, 1:35, 1:36, 1:37, 1:38, 1:39, 1:40, or any range therein. In certain instances, the ratio between 1:5 to 1:20, or alternatively about 1:10.

The clarifying agent blend can be added to a thermoplastic polyolefin composition at any amount to achieve a desired result. By way of example, a thermoplastic polyolefin composition of the present invention can have 0.001 wt. % to 5 wt. %, alternatively 0.01 wt. % to 1 wt. % of the clarifying agent blend. In some instances, the thermoplastic polyolefin composition can have 0.005, 0.010, 0.015, 0.20, 0.025, 0.030, 0.035, 0.040, 0.045, 0.050, 0.055, 0.060, 0.065, 0.070, 0.075, 0.080, 0.085, 0.090, 0.095, 0.1, 0.2, 0.3, 0.4, 0.5, 0.6, 0.7, 0.8, 0.9, 1.0, 1.5, 2.0, 2.5, 3.0, 3.5, 4.0, or 4.5 up to 5 wt. %, or any range therein, of the clarifying agent blend. In certain instances, the thermoplastic polyolefin composition has 0.1 to 0.5 wt. %, or even alternatively, 0.2 wt. % to 0.25 wt. %, of the clarifying agent blend. Amount below and the above the aforementioned amounts are also contemplated in the context of the present invention.

C. Additives

The thermoplastic polyolefin compositions of the present invention can further comprise at least one additive. Additives include, but are not limited, to a light stabilizer, an anti-static agent, a rheological modifier, a lubricant, an antioxidant, or any combination thereof.

Light stabilizer. In certain aspects 0.01 wt. % to 1 wt. %, alternatively 0.01 wt. % to 0.1 wt. % of the composition is a light stabilizer. In certain aspects the light stabilizer is Chimassorb 944™ (Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], CAS Number: 71878-19-8); Tinuvin 622™ (Butanedioic acid, dimethylester, polymer with 4-hydroxy-2,2,6,6-tetramethyl-1-piperidine ethanol, CAS Number: 65447-77-0); Uvinul 5050H™ (Alkenes, C20-24α-, polymers with maleic anhydride, reaction products with 2,2,6,6-tetramethyl-4-piperidinamine, CAS Number: 152261-33-1) or Chimassorb 119™ (1,5,8,12-Tetrakis[4,6-bis(N-butyl-N-1,2,2,6,6-pentamethyl-4-piperidylamino)-1,3,5-triazin-2-yl]-1,5,8,12-tetraazadodecane, CAS Number: 106990-43-6). In other aspects the light stabilizer can be a hindered amine light stabilizer. The term "hindered amine light stabilizer" refers to a class of amine compounds having certain light stabilizing properties. Hindered amine light stabilizers (HALS) include, but are not limited to (1) 1-cyclohexyloxy-2,2,6,6-tetramethyl-4-octadecylaminopiperidine, (2) bis(2,2,6,6-tetramethylpiperidin-4-yl) sebacate, (3) bis(1-acetoxy-2,2,6,6-tetramethylpiperidin-4-yl) sebacate, (4) bis(1,2,2,6,6-pentamethylpiperidin-4-yl) sebacate, (5) bis(1-cyclohexyloxy-2,2,6,6-tetramethylpiperidin-4-yl) sebacate, (6) bis(1-octyloxy-2,2,6,6-tetramethylpiperidin-4-yl) sebacate; (7) bis(1-acyl-2,2,6,6-tetramethylpiperidin-4-yl) sebacate, (8) bis(1,2,2,6,6-pentamethyl-4-piperidyl) n-butyl-3,5-di-tert-butyl-4-hydroxybenzyl malonate, (9) 2,4-bis[(1-cyclohexyloxy-2,2,6,6-tetramethylpiperidin-4-yl) butylamino]-6-(2-hydroxyethyl amino-s-triazine, (10) bis(1-cyclohexyloxy-2,2,6,6-tetramethylpiperidin-4-yl) adipate, (11) 2,4-bis[(1-cyclohexyloxy-2,2,6,6-piperidin-4-yl)butylamino]-6-chloro-s-triazine, (12) 1-(2-hydroxy-2-methylpropoxy)-4-hydroxy-2,2,6,6-tetramethylpiperidine, (13) 1-(2-hydroxy-2-methylpropoxy)-4-oxo-2,2,6,6-tetramethylpiperidine, (14) 1-(2-hydroxy-2-methyl propoxy)-4-octadecanoyloxy-2,2,6,6-tetramethyl piperidine, (15) bis(1-(2-hydroxy-2-methylpropoxy)-2,2,6,6-tetramethylpiperidin-4-yl) sebacate, (16) bis(1-(2-hydroxy-2-methylpropoxy)-2,2,6,6-tetramethylpiperidin-4-yl) adipate, (17) 2,4-bis{N-[1-(2-hydroxy-2-methyl propoxy)-2,2,6,6-tetramethylpiperidin-4-yl]-N-butylamino}-6-(2-hydroxy ethylamino)-s-triazine, (18) 4-benzoyl-2,2,6,6-tetramethylpiperidine, (19) di-(1,2,2,6,6-pentamethylpiperidin-4-yl) p-methoxybenzylidenemalonate, (20) 2,2,6,6-tetramethylpiperidin-4-yl octadecanoate, (21) bis(1-octyloxy-2,2,6,6-tetramethylpiperidyl) succinate, (22) 1,2,2,6,6-pentamethyl-4-aminopiperidine, (23) 2-undecyl-7,7,9,9-tetramethyl-1-oxa-3,8-diaza-4-oxo-spiro[4,5]decane, (24) tris(2,2,6,6-tetramethyl-4-piperidyl) nitrilotriacetate, (25) tris(2-hydroxy-3-(amino-(2,2,6,6-tetramethylpiperidin-4-yl) propyl) nitrilotriacetate, (26) tetrakis(2,2,6,6-tetramethyl-4-piperidyl)-1,2,3,4-butane-tetracarboxylate, (27) tetrakis(1,2,2,6,6-pentamethyl-4-piperidyl)-1,2,3,4-butane-tetracarboxylate, (28) 1,1'-(1,2-ethanediyl)-bis(3,3,5,5-tetramethylpiperazinone), (29) 3-n-octyl-7,7,9,9-tetramethyl-1,3,8-triazaspiro[4.5]decan-2,4-dione, (30) 8-acetyl-3-dodecyl-7,7,9,9-tetramethyl-1,3,8-triazaspiro [4.5]decane-2,4-dione, (31) 3-dodecyl-1-(2,2,6,6-tetramethyl-4-piperidyl)pyrrolidin-2,5-dione, (32) 3-dodecyl-1-(1,2,2,6,6-pentamethyl-4-piperidyl)pyrrolidine-2,5-dione, (33) N,N'-bis-formyl-N,N'-bis(2,2,6,6-tetramethyl-4-piperidyl) hexamethylenediamine, (34) reaction product of 2,4-bis[(1-cyclohexyloxy-2,2,6,6-piperidin-4-yl)butylamino]-6-chloro-s-triazine with N,N'-bis(3-aminopropyl) ethylenediamine), (35) condensate of 1-(2-hydroxyethyl)-2,2,6,6-tetramethyl-4-hydroxypiperidine and succinic acid, (36) condensate of N,N'-bis(2,2,6,6-tetramethyl-4-piperidyl)-hexamethylenediamine and 4-tert-octylamino-2,6-dichloro-1,3,5-triazine, (37) condensate of N,N'-bis(2,2,6,6-tetramethyl-4-piperidyl)-hexamethylenediamine and 4-cyclohexylamino-2,6-dichloro-1,3,5-triazine, (38) condensate of N,N'-bis-(2,2,6,6-tetramethyl-4-piperidyl)hexamethylenediamine and 4-morpholino-2,6-dichloro-1,3,5-triazine, (39) condensate of N,N'-bis-(1,2,2,6,6-pentamethyl-4-piperidyl)hexamethylenediamine and 4-morpholino-2,6-dichloro-1,3,5-triazine, (40) condensate of 2-chloro-4,6-bis(4-n-butylamino-2,2,6,6-tetramethyl piperidyl)-1,3,5-triazine and 1,2-bis(3-aminopropylamino)ethane, (41) condensate of 2-chloro-4,6-di-(4-n-butylamino-1,2,2,6,6-pentamethylpiperidyl)-1,3,5-triazine and 1,2-bis-(3-aminopropylamino)ethane, (42) a reaction product of 7,7,9,9-tetramethyl-2-cycloundecyl-1-oxa-3,8-diaza-4-oxospiro [4,5]decane and epichlorohydrin, (43) poly [methyl, (3-oxy-(2,2,6,6-tetramethylpiperidin-4-yl)propyl)]siloxane, CAS #182635-99-0, (44) reaction product of maleic acid anhydride-C18-C22-α-olefin-copolymer with 2,2,6,6-tetramethyl-4-aminopiperidine, (45) oligomeric condensate of 4,4'-hexamethylenebis(amino-2,2,6,6-tetramethylpiperidine) and 2,4-dichloro-6-[(2,2,6,6-tetramethylpiperidin-4-yl) butylamino]-s-triazine end-capped with 2-chloro-4,6-bis (dibutylamino)-s-triazine, (46) oligomeric condensate of 4,4'-hexamethylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine, (47) oligomeric condensate of 4,4'-hexamethylenebis(amino-1-propoxy-2,2,6,6-tetramethyl piperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine, (48) oligomeric condensate of 4,4'-hexamethylenebis(amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and (49) product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine. Also included are the sterically hindered N-H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds.

Antistatic agent. One method for reducing the accumulation of dust on plastic articles is to use antistatic agents. Antistatic agents improve the electrical conductivity of the plastic compositions and thus dissipate any surface charges which develop during production and use. Dust particles are thus less attracted and dust accumulation is consequently reduced. In certain aspects of the present invention the antistatic agent is a glycerol monostearate (GMS), ethoxylated fatty acid amines, diethanolamides, or ethoxylated sorbitan esters. A composition of the invention can include 0.01 wt. % to 1 wt. %, alternatively 0.01 wt. % to 0.1 wt. % of an anti-static agent.

Rheological modifier. Rheological modifiers are additives that affect the material's flow properties. Rheological modifiers include organic peroxides. There are two classes of organic peroxides that can be used in the context of the present invention—dialkyl and peroxyketal type peroxides. An example of a commercially available dialkyl peroxide is 2,5-dimethyl-2,5-di(t-butylperoxy)hexane, available as LUPERSOL® 101, from Atofina Chemicals, Inc. Two commercially available peroxyketal peroxides are LUPERSOL® 233 and 533, which are examples of t-butyl and t-amyl type peroxides, respectively, and are also available from Atofina Chemicals, Inc. The choice of organic peroxide may vary depending upon the particular application and extruder temperatures. In certain aspects the organic peroxide is Trigonox 301™ (3,6,9-Triethyl-3,6,9,-trimethyl-1,4,7-triperoxonane in solution with isoparaffinic hydrocarbons, CAS Number: 24748-23-0). A composition of the invention can include 0.01 wt. % to 1 wt. %, alternatively 0.01 wt. % to 0.1 wt. %, of the rheological modifier.

Lubricant. A lubricant can be added to a thermoplastic polymer to improve the mold-making characteristics. The lubricant is usually a low molecular compound from a group of fatty acids, fatty acid esters, wax ester, fatty alcohol ester, amide waxes, metal carboxylate, montanic acids, montanic acid ester or such high molecular compounds, as paraffines or polyethylene waxes. In certain aspects of the present invention the lubricant is a metal stearate such as, but not limited to, zinc stearate, calcium stearate, lithium stearate, potassium stearate, and/or magnesium stearate. In certain aspects the compositions of the invention include 0.01 wt. % to 1 wt. %, alternatively 0.01 wt. % to 0.1 wt. % of a lubricant.

Antioxidant. Antioxidants can provide protection against polymer degradation during processing. Phosphites are known thermal oxidative stabilizing agents for polymers and other organic materials. The antioxidant is a phosphite-based antioxidant. In certain aspects phosphite-antioxidants include, but are not limited to, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphate, tristearyl sorbitol triphosphite, tetrakis(2,4-ditertbutylphenyl)-4,4'-biphenylene diphosphonate, Doverphos® S-9228 (Bis (2,4-dicumylphenyl) pentaerythritol diphosphate, CAS Number: 154862-43-8), Doverphos® LGP-11 (Phosphorous acid, triphenyl ester, polymer with α-hydro-ω-hydroxypoly[oxy(methyl-1,2-ethanediyl)], C10-16 alkyl esters, CAS Number: 1227937-46-3) and Irganox® HP-136 (5,7-bis(1,1-dimethylethyl)-3-[2,3 (or 3,4)-dimethylphenyl]-2(3H)-benzofuranone, CAS Number: 201815-03-4). In certain aspects the compositions of the invention include 0.01 wt. % to 1 wt. %, alternatively 0.01 wt. % to 0.1 wt. % of an antioxidant.

D. Making the Theromplastic Polyolefin Composition

The addition of clarifying agents and optionally additives to the polyolefin composition can be carried out in a customary mixing machine, in which the polymer is melted and mixed with the clarifying agents and optional additives. Suitable machines are known to those skilled in the art. They are predominantly mixers, kneaders and extruders. In certain aspects the process is carried out in an extruder by introducing the additives during processing. Processing machines include single-screw extruders, contrarotating and co-rotating twin-screw extruders, planetary-gear extruders, ring extruders, or co-kneaders. It is also possible to use processing machines provided with at least one gas removal compartment to which a vacuum can be applied.

Components can be premixed or added individually. By way of example, the clarifying agent blends of the present invention can be premixed such that the blend is formed prior to adding it to the polyolefin composition. Alternatively, the trisamide-based clarifier and the sorbitol-based clarifier can each be added separately to the polyolefin composition. If the clarifiers are added separately, then then can be added simultaneously to the composition or at different sequences (e.g., the trisamide clarifier can be added first followed by the sorbitol clarifier, or vice versa). The polyolefin can be subjected to an elevated temperature for a sufficient period of time during incorporation of additives. The temperature is generally above the softening point of the polymers. In certain aspects a process can be performed at a temperature from about 160° C. to 280° C. Such "melt mixing" or "melt compounding" results in uniform dispersion of the present additives in the polyolefin. Incorporation of additives into the polyolefin resin can be carried out, for example, by mixing the above-described components using methods customary in process technology.

The polyolefin compositions are normally collected as pellets, which may be stored for a time or employed immediately in a forming process. The forming processes include injection molding, extrusion blow molding, injection stretch blow molding, thermoforming, compression molding or sheet extrusion. The final formed articles are for instance molded parts, sheets, films or fibers. For example lids, bottles, containers, automotive parts, refrigerator parts, trays, computer parts and the like.

The polyolefinic articles can exhibit a reduced haze. Light transmission, clarity and haze are measured according to ASTM D1003. The present articles exhibit a haze value of less than 40 according to ASTM D1003. The compositions of the present invention can have a haze % between 2, 5, 10, 15, 20, 25, 30, 35, to 40%, including all values and ranges there between, at a thickness of 5, 10, 15, 20, 25, 30, 35, 40, 45, 50, 55, 60, 65, 70, 75, 80, 85, 90, 95, 100 or more. In certain aspects the thickness can be between 20 to 80 mils.

The following example as well as the figures are included to demonstrate certain embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Clarifier Blends

Clarifier blends are described that outperform blends of NX8000 and Millad 3988 as quantified by lower haze and increased gloss. The clarifier blends provide (i) improved thick wall molded clarity compared to a neat trisamide derivative, such as neat XT386; (ii) improved gloss compared to a neat trisamide derivative, such as neat XT386; and (iii) improved high temperature molded haze and gloss compared to neat sorbitol derivatives, such as Millad 3988 and NX8000.

Various clarifier formulations used in the study are listed in table 1. The balance of the additives was held constant in this study. Haze percent and gloss at 45 degrees was determined for various formulations, where trisamide clarifier XT386 (N-[3,5-bis-(2,2-dimethyl-propionylamino)-phenyl]-2,2-dimethylpropionamide) is formulated with sorbitol clarifiers Millad 3988 and NX8000.

TABLE 1

(Clarifier formulations)

| | |
|---|---|
| Formulation #1 | 200 ppm XT386 |
| Formulation #2 | 200 ppm XT386 + 1560 ppm Millad 3988 |
| Formulation #3 | 200 ppm XT386 + 2000 ppm Millad 3988 |
| Formulation #4 | 2000 ppm Millad 3988 |
| Formulation #5 | 200 ppm XT386 + 1560 ppm NX8000 |
| Formulation #6 | 200 ppm XT386 + 2000 ppm NX8000 |
| Formulation #7 | 2200 ppm NX8000 |
| Formulation #8 | 2200 ppm Millad 3988 + 2200 ppm NX8000 |

Figure 2:
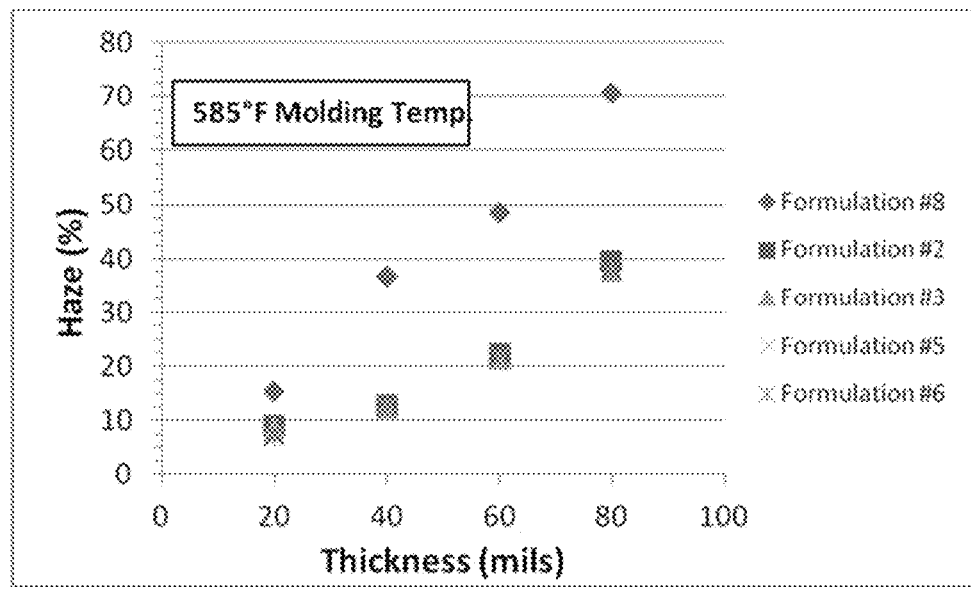
FIG. 2 illustrates the resulting haze percent as determined for formulations 2, 3, 5, 6, and 8 as a function of thickness at molding temperature of 585° F.
Figure 3:
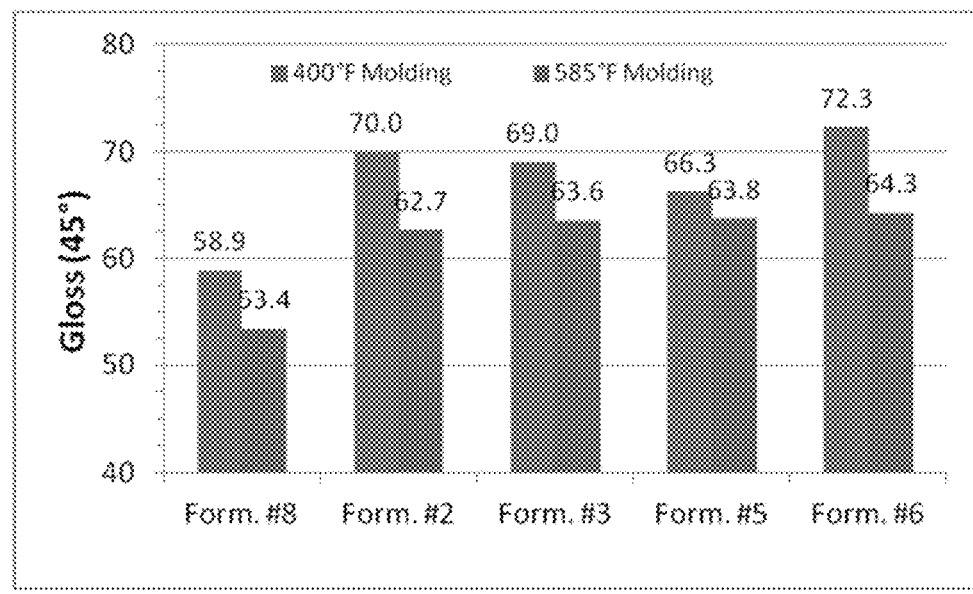
FIG. 3 illustrates gloss at 45 degrees for formulations 8, 2, 3, 5, and 6 at molding temperatures of 400° F. and 585° F.
Figure 4:
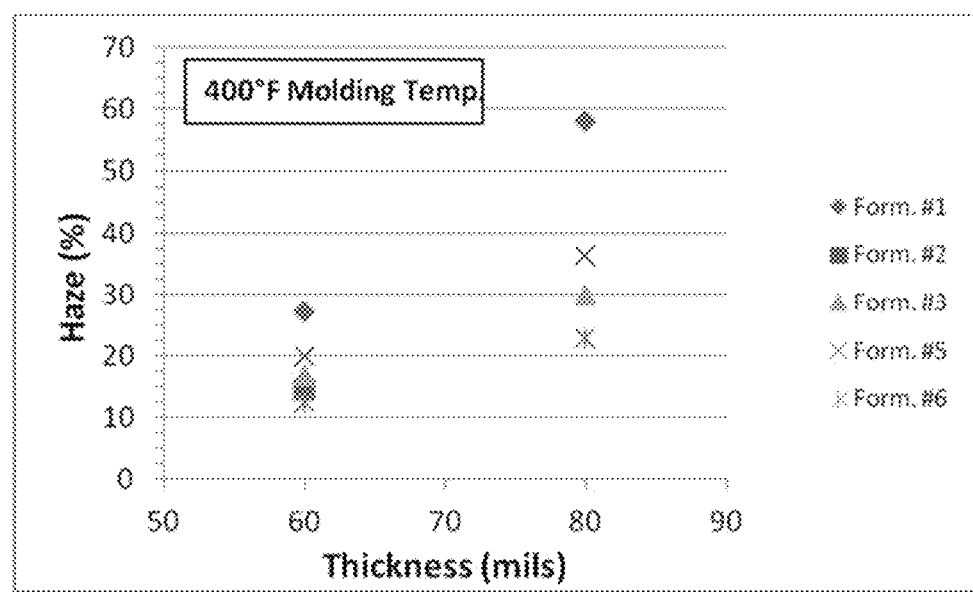
FIG. 4 illustrates the resulting haze percent as determined for formulations 1, 2, 3, 5, and 6 as a function of thickness at molding temperature of 400° F.
Figure 5:
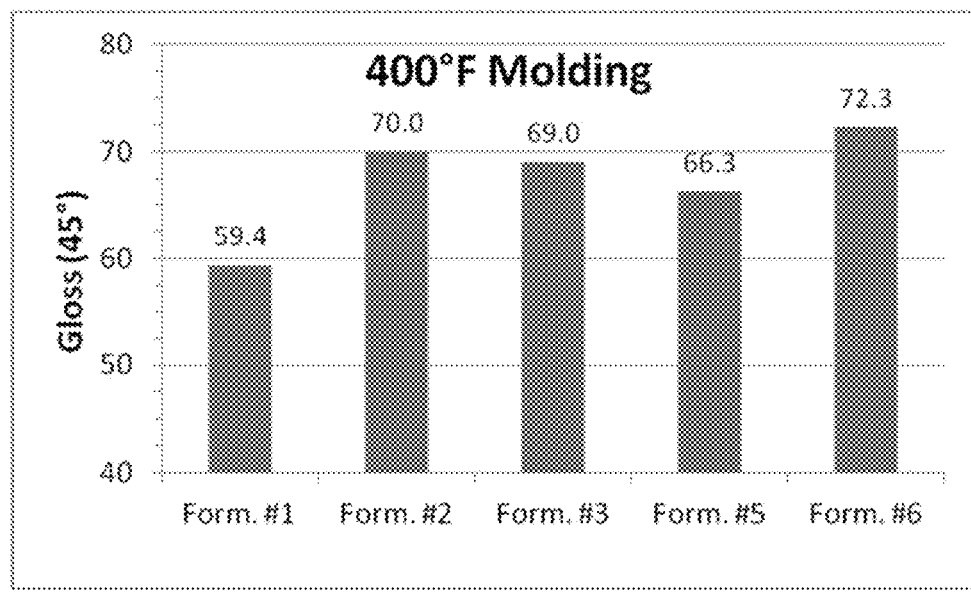
FIG. 5 illustrates gloss at 45 degrees for formulations 1, 2, 3, 5, and 6 at molding temperatures of 400° F.
Figure 6:
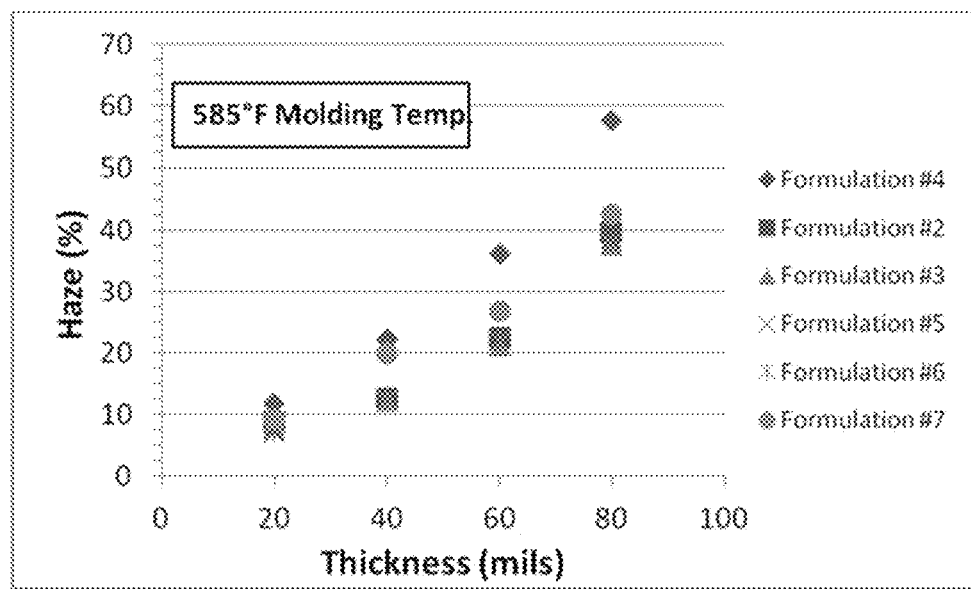
FIG. 6 illustrates the resulting haze percent as determined for formulations 4,2, 3, 5, 6, and 7 as a function of thickness at molding temperature of 585° F.
Figure 7:
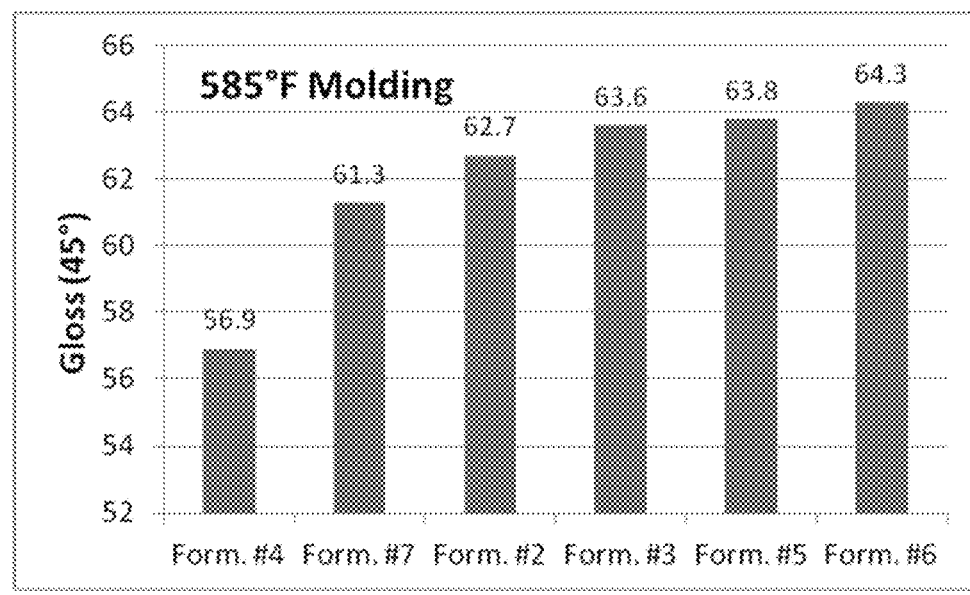
FIG. 7 illustrates gloss at 45 degrees for formulations 4, 7, 2, 3, 5, and 6 at molding temperatures of 585° F.

The various formulations were molded at 400° F. (204° C.) and 585° F. (307° C.) at thicknesses of 20, 40, 60, and 80 mils after which the haze % was determined. Haze was determined for formulations 2, 3, 5, 6, and 8 as a function of thickness at molding temperature of 400° F. (FIG. 1) and 585° F. (FIG. 2). FIG. 3 illustrates gloss at 45 degrees for formulations 8, 2, 3, 5, and 6 at molding temperatures of 400° F. and 585° F. FIG. 4 illustrates the resulting haze percent as determined for formulations 1, 2, 3, 5, and 6 as a function of thickness at molding temperature of 400° F. FIG. 5 illustrates gloss at 45 degrees for formulations 1, 2, 3, 5, and 6 at molding temperatures of 400° F. FIG. 6 illustrates the resulting haze percent as determined for formulations 4,2, 3, 5, 6, and 7 as a function of thickness at molding temperature of 585° F. FIG. 7 illustrates gloss at 45 degrees for formulations 4, 7, 2, 3, 5, and 6 at molding temperatures of 585° F.

What is claimed is:

1. A thermoplastic polyolefin composition comprising:
   (a) a thermoplastic polyolefin; and
   (b) a clarifying agent blend comprising a trisamide clarifier and a sorbitol clarifier at a ratio of trisamide clarifier to sorbitol clarifier of 1:2 to 1:40 w/w, wherein the clarifying agent blend is about 0.2 to 0.25 wt. % of the thermoplastic polyolefin composition.

2. The composition of claim 1, wherein the clarifying agent blend has a trisamide clarifier to sorbitol clarifier ratio of about 1:10.

3. The composition of claim 1, wherein the trisamide clarifier is a trisamide benzene compound.

4. The composition of claim 3, wherein the trisamide benzene compound is N,N',N''-benzene-1,3,5-triyltris(2,2-dimethylpropanamide).

5. The composition of claim 1, wherein the sorbitol clarifier is 1,2,3,4-dibenzylidene sorbitol, 1,2,3,4 di-para-methylbenzylidene sorbitol, 1,2,3,4 di-meta, para-methylbenzylidene sorbitol, or 1,2,3-trideoxy-4,6:5,7-bis-O-[(4-propylphenyl)methylene]-Nonitol.

6. The composition of claim 1, wherein the thermoplastic polyolefin is polypropylene.

7. The composition of claim 1, wherein
   the trisamide clarifier is N,N',N''-benzene-1,3,5-triyltris(2,2-dimethylpropanamide),
   the sorbitol clarifier is 1,2,3,4-dibenzylidene sorbitol, 1,2,3,4-di-para-methylbenzylidene sorbitol, 1,2,3,4-di-meta, para-methylbenzylidene sorbitol, or 1,2,3-trideoxy-4,6:5,7-bis-O-[(4-propylphenyl)methylene]-Nonitol, and
   the thermoplastic polyolefin is polypropylene.

8. The composition of claim 7, wherein the sorbitol clarifier is 1,2,3-trideoxy-4,6:5,7-bis-0-(4-propylphenyl)methylene]-Nonitol.

9. The composition of claim 1, wherein the composition is in the form of a pellet.

10. The composition of claim 1, wherein the composition is in the form of a molded or extruded article.

11. The composition of claim 1, wherein the composition has a haze % of 2 to 40% at a thickness of 20 to 80 mils.

12. The composition of claim 1, further comprising at least one additive selected from a light stabilizer, an anti-static agent, a rheological modifier, a lubricant, an antioxidant, or any combination thereof.

13. The composition of claim 12, comprising:
    0.01 wt. % to 1 wt. % of the light stabilizer;
    0.01 wt. % to 1 wt. % of the anti-static agent;
    0.01 wt. % to 1 wt. % of the rheological modifier;
    0.01 wt. % to 1 wt. % of the lubricant; and/or
    0.01 wt. % to 1 wt. % of the antioxidant.

14. The composition of claim 12, wherein:
    the light stabilizer is a hindered amine light stabilizer;
    the anti-static agent is a glycerol monostearate;
    the rheological modifier is an organic peroxide;
    the lubricant is a metal stearate; and/or
    the antioxidant is a phosphite-based antioxidant.

15. The composition of claim 1, comprising at least 90 wt. % of the thermoplastic polyolefin or a blend of thermoplastic polyolefins.

16. A method for clarifying a thermoplastic polyolefin composition, the method comprising combining an effective amount of a clarifying agent blend to a thermoplastic polyolefin composition, the clarifying agent blend comprising a trisamide clarifier and sorbitol clarifier at a ratio of between 1:2 to 1:40, wherein the clarifying agent blend is about 0.2 to 0.25 wt. % of the thermoplastic polyolefin composition.

17. The method of claim 16, wherein
    the thermoplastic polyolefin composition is a thermoplastic polypropylene composition,
    the trisamide clarifier is N,N',N''-benzene-1,3,5-triyltris(2,2-dimethylpropanamide), and
    the sorbitol clarifier is 1,2,3,4-dibenzylidene sorbitol, 1,2,3,4-di-para-methylbenzylidene sorbitol, 1,2,3,4-di-meta, para-methylbenzylidene sorbitol, or 1,2,3-trideoxy-4,6:5,7-bis-O-[(4-propylphenyl)methylene]-Nonitol.

18. A method for reducing haze in a thermoplastic polyolefin composition, the method comprising:
    (a) combining an effective amount of a clarifying agent blend comprising a trisamide clarifier and sorbitol clarifier at a ratio of between 1:2 to 1:40 to a thermoplastic polyolefin composition, wherein the clarifying agent blend is about 0.2 to 0.25 wt. % of the thermoplastic polyolefin composition; and
    (b) extruding or molding the thermoplastic polyolefin composition, wherein the thermoplastic polyolefin composition has a haze % of 2 to 40% at a thickness of 20 to 80 mils.

19. The method of claim 18, wherein
    the thermoplastic polyolefin composition is a thermoplastic polypropylene composition,
    the trisamide clarifier is N,N',N''-benzene-1,3,5-triyltris(2,2-dimethylpropanamide), and
    the sorbitol clarifier is 1,2,3,4-dibenzylidene sorbitol, 1,2,3,4-di-para-methylbenzylidene sorbitol, 1,2,3,4-di-meta, para-methylbenzylidene sorbitol, or 1,2,3-trideoxy-4,6:5,7-bis-O-[(4-propylphenyl)methylene]-Nonitol.

* * * * *